(12) United States Patent
Nishikawa et al.

(10) Patent No.: US 9,906,088 B2
(45) Date of Patent: Feb. 27, 2018

(54) ROTOR-HOLDING STRUCTURE OF ROTATING ELECTRICAL MACHINE FOR HYBRID VEHICLE

(71) Applicant: Mitsubishi Electric Corporation, Tokyo (JP)

(72) Inventors: Ken Nishikawa, Tokyo (JP); Masaya Inoue, Tokyo (JP); Koichi Ojima, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 102 days.

(21) Appl. No.: 14/649,989

(22) PCT Filed: Apr. 15, 2013

(86) PCT No.: PCT/JP2013/061183
§ 371 (c)(1),
(2) Date: Jun. 5, 2015

(87) PCT Pub. No.: WO2014/170940
PCT Pub. Date: Oct. 23, 2014

(65) Prior Publication Data
US 2015/0318754 A1   Nov. 5, 2015

(51) Int. Cl.
*H02K 5/15* (2006.01)
*H02K 5/04* (2006.01)
(Continued)

(52) U.S. Cl.
CPC ............. *H02K 5/15* (2013.01); *H02K 5/04* (2013.01); *H02K 15/0006* (2013.01); *H02K 1/185* (2013.01)

(58) Field of Classification Search
CPC ............ H02K 1/185; H02K 5/04; H02K 5/15; H02K 5/16; H02K 5/1675; H02K 5/1677; H02K 15/0006; H02K 15/16
(Continued)

(56) References Cited

U.S. PATENT DOCUMENTS 5,677,582 A * 10/1997 Lutz .................... B60K 1/02
                                                          310/113
7,671,496 B2 * 3/2010 Groening ............ F16C 32/0493
                                                          310/162
(Continued)

FOREIGN PATENT DOCUMENTS

CN    102377262 A    3/2012
EP    2 385 614 A1   11/2011
(Continued)

OTHER PUBLICATIONS

Kaneko, English Translation of WO2012/046314, Apr. 12, 2012.*
(Continued)

*Primary Examiner* — Bernard Rojas
*Assistant Examiner* — Rashad Johnson
(74) *Attorney, Agent, or Firm* — Sughrue Mion, PLLC; Richard C. Turner

(57) ABSTRACT

It is an object of the present invention, to provide a rotor-holding structure of a rotating electrical machine for hybrid-vehicle, the structure being capable of ensuring a space is present between a stator and a rotor. A rotating electrical machine includes a stator and a rotor, the stator being fixed to a housing, and the rotor being disposed opposite to stator across a predetermined space, wherein the rotor has a rotor boss section, a rotor core, and a permanent magnet. The rotor boss section is rotatably attached to the housing through a bearing. The rotor core and the permanent magnet are attached to the rotor boss section. Multiple through-holes are
(Continued)

provided at the respective corresponding locations of the housing and the rotor boss section. A supporting member is passed through each of the through-holes, thereby holding the rotor boss section.

5 Claims, 5 Drawing Sheets

(51) Int. Cl.
*H02K 15/00* (2006.01)
*H02K 1/18* (2006.01)

(58) Field of Classification Search
USPC .............................................. 310/89, 90, 400
See application file for complete search history.

(56) References Cited

U.S. PATENT DOCUMENTS

| 2005/0104461 | A1 | 5/2005 | Hatz et al. |
| 2007/0273235 | A1* | 11/2007 | Kaizuka ............... H02K 21/029 310/156.53 |
| 2008/0054767 | A1* | 3/2008 | Groening ............ F16C 32/0493 310/75 R |
| 2010/0231081 | A1* | 9/2010 | Iwata ..................... H02K 1/276 310/191 |
| 2010/0254642 | A1* | 10/2010 | Watanabe ................ G01B 7/30 384/448 |
| 2011/0273045 | A1 | 11/2011 | Vuolle-Apiala et al. |
| 2012/0299419 | A1* | 11/2012 | Tanaka ................ F16H 57/0476 310/90 |
| 2012/0312259 | A1* | 12/2012 | Yamanaka ............. F01L 1/352 123/90.15 |
| 2013/0011087 | A1* | 1/2013 | Watanabe ................ G01B 7/30 384/448 |
| 2013/0273045 | A1* | 10/2013 | Watkins ................. A61K 38/53 424/134.1 |

FOREIGN PATENT DOCUMENTS

| JP | 2005-531271 A | 10/2005 |
| JP | 2007-174752 A | 7/2007 |
| JP | 2007-181377 A | 7/2007 |
| JP | 2007-259620 A | 10/2007 |
| JP | 2008-306842 A | 12/2008 |
| JP | 2012-39809 A | 2/2012 |
| WO | WO 2012046314 A1 * | 4/2012 ........... H02K 5/1732 |

OTHER PUBLICATIONS

Communication dated Sep. 15, 2015 from the Japanese Patent Office in counterpart application No. 2015-512210.
International Search Report of PCT/JP2013/061183 dated Jun. 25, 2013.
Communication dated Feb. 4, 2017, from the State Intellectual Property of the P.R.C. In counterpart Chinese application No. 201380075593.1.
Communication dated Oct. 12, 2017 from the German Patent and Trademark Office in counterpart German application No. 11 2013 006 947.4.

* cited by examiner

ROTOR-HOLDING STRUCTURE OF ROTATING ELECTRICAL MACHINE FOR HYBRID VEHICLE

TECHNICAL FIELD

The present invention relates to a rotor-holding structure of a rotating electrical machine for hybrid vehicle.

BACKGROUND ART

In some cases, a rotating electrical machine attached to a hybrid vehicle adopts a structure in which other components, such as a clutch, are formed into one unit on an inner side of a rotor boss section. The rotor boss section has cantilever structure on a bearing held in an inner peripheral portion of a housing. Accordingly, an outer peripheral surface of a rotor core and an inner peripheral surface of stator core are attracted by a magnetic force developed in a permanent magnet and the rotor and the stator undergo a positional displacement. Such a displacement can raise a problem when the other components, such as a clutch, are fit in a subsequent process.

In order to avoid this problem, an assembly method as follows is proposed (PTL 1). That is, a stator housing and the rotor boss section are attached with bolts using a secondary jig to adjust an air gap between the rotor core and the stator core.

CITATION LIST

Patent Literature

PTL 1: JP-A-2007-174752

SUMMARY OF INVENTION

Technical Problem

In the rotating electrical machine described in PTL 1, however, the housing to which is fixed the stator is opened. It is therefore necessary to form a large-scale secondary jig to support the entire housing. It is also necessary to provide multiple screw holes in which bolts are inserted to fix the housing and the rotor boss section to the secondary jig. Hence, PTL 1 has a problem that man-hours for processing on the housing and the rotor boss section are increased.

The invention was devised to solve the problems discussed above and provides a rotor-holding structure of a rotating electrical machine capable of holding a rotor inside a housing while a space is secured between an inner periphery of a stator core and an outer periphery of a rotor core and also capable of fitting other components on an inner side of a rotor boss section in a stable manner using a simple structure without using a large-scale jig.

Solution to Problem

A rotor-holding structure of a rotating electrical machine for hybrid vehicle of the invention is a rotating electrical machine including a stator fixed to a housing and a rotor oppositely spaced apart from the stator by a predetermined space. The rotor has a rotor boss section rotatably attached to the housing via a bearing and a rotor core and a permanent magnet both attached to the rotor boss section. Multiple through-holes are provided to each of the housing and the rotor boss section at locations at which the respective through-holes in the housing correspond to the respective through-holes in the rotor boss section, so that the rotor boss section is held by inserting supporting members into the respective through-holes.

Advantageous Effects of Invention

According to the invention, the position of the rotor with respect to the stator can be maintained without having to use a large-scale jig and components can be readily fit on the inner side of a rotor boss section.

DESCRIPTION OF EMBODIMENTS

First Embodiment

Hereinafter, the invention will be described according to the drawings showing an embodiment.

Figure 1:
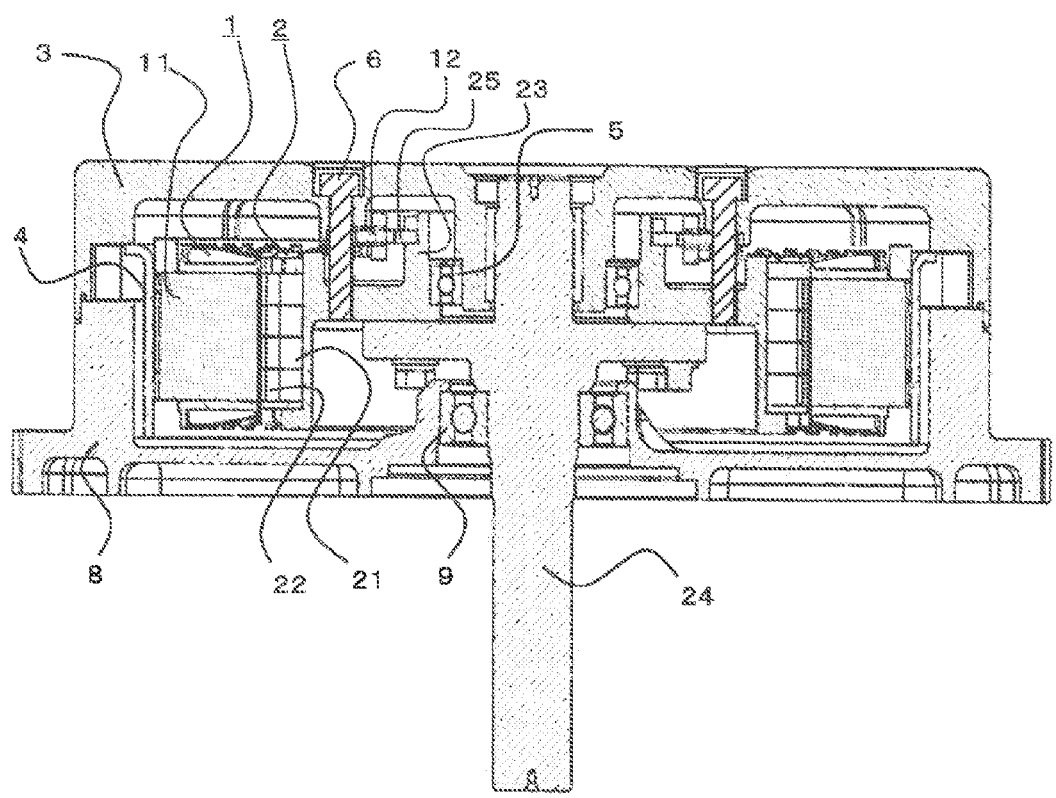
FIG. 1 is a cross section schematically showing a configuration of a rotating electrical machine according to a first embodiment of the invention.
Figure 2:
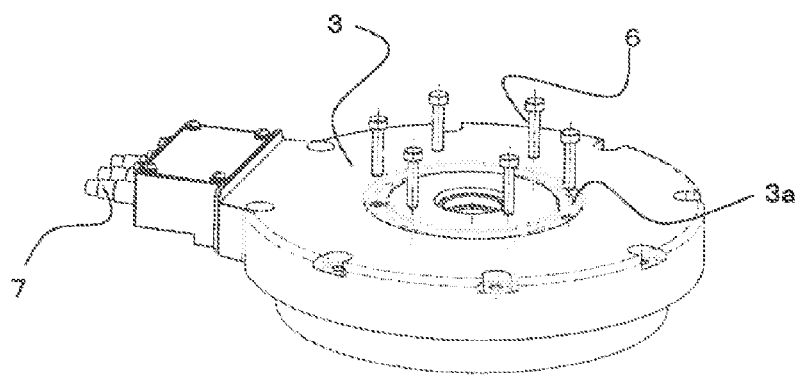
FIG. 2 is a developed perspective view schematically showing the configuration of the rotating electrical machine of FIG. 1.

FIG. 1 is a cross section schematically showing a configuration of a rotating electrical machine according to a first embodiment of the invention. FIG. 2 is a developed perspective view schematically showing the configuration of FIG. 1.

Referring to FIGS. 1 and 2, the rotating electrical machine includes a stator 1 and a rotor 2 oppositely spaced apart from the stator 1 by a predetermined space. The stator 1 has a stator core 11 formed of a laminated steel plate. The stator core 11 is press-fit to and thereby fixed along an inner periphery of a ring-like frame 4 attached to a housing 3.

The rotor 2 includes a rotor core 21 formed of a laminated steel plate and a permanent magnet 22 disposed inside the rotor core 21. The rotor core 21 is press-fit to and thereby fixed along an outer periphery of a rotor boss section 23. The rotor boss section 23 is rotatably attached to the housing 3 via a bearing 5. Further, the rotor boss section 23 is fixed to a rotation shaft 24 coupled to an engine shaft and a clutch of a transmission. Also, a resolver rotor 25 is attached to a part of the rotor boss section 23. Meanwhile, a resolver stator 12 is attached to the housing 3 opposing the resolver rotor 25 while maintaining a predetermined space in between. This configuration allows a rotation angle of the resolver rotor 25 to be detected and the detected rotation angle is used to control the rotation of the device. The stator 1 is fed from the outside by a harness 7 to generate a rotating field. A torque is outputted as the rotor 2 is driven to rotate by the rotating field.

In the rotating electrical machine having the structure of the stator 1 and the rotor 2 as above, the rotor boss section 23 is supported on the bearing 5 like a cantilever. Hence, the rotor boss section 23 may possibly incline due to an attraction force of the permanent magnet 22. Such an inclination raises a problem when components forming the transmission, such as a clutch, are disposed on the inner side of the rotor boss section 23.

In order to eliminate this inconvenience, multiple through-holes are provided to the rotor boss section 23 and also through-holes are provided to the housing 3 at locations corresponding to the through-holes in the rotor boss section 23. A yoke portion of the rotor boss section 23 on the inner peripheral side is positioned by inserting supporting members 6 into respective through-holes from the outside. When configured in this manner, a position of the entire rotor 2 with respect to the stator 1 can be maintained. Hence, components to be fit on the inner side of the rotor 2 can be disposed in a stable manner.

More specifically, not only can a housing 8 of the clutch or the like be fit to the housing 3, but also the housing 8 can be supported on the rotation shaft 24 via a bearing 9 while the entire rotor 2 is positioned and supported on the bearing 5 and by the supporting members 6. Accordingly, components, such as the clutch, to be fit on the inner side of the rotor 2 can be attached efficiently. The supporting members 6 are removed later and the resulting assembly is provided as a product.

As is shown in FIG. 1, the supporting members 6 are shaped like circular cylinders with heads and an annular groove 3a to store the heads is provided to the housing 3.

Figure 3:
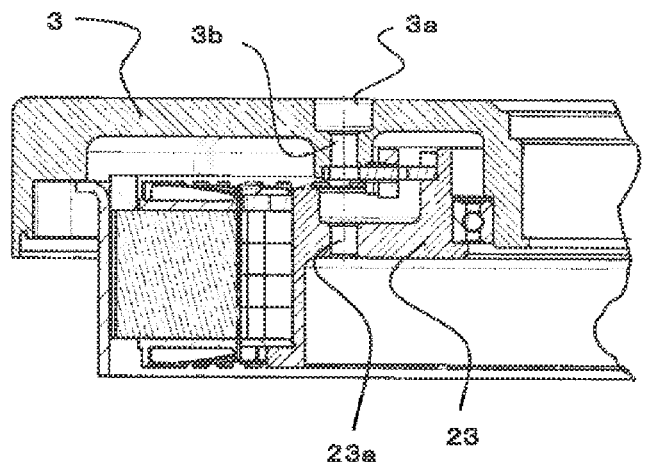
FIG. 3 is a cross section showing a configuration of a major portion of the rotating electrical machine according to the first embodiment of the invention.
Figure 4:
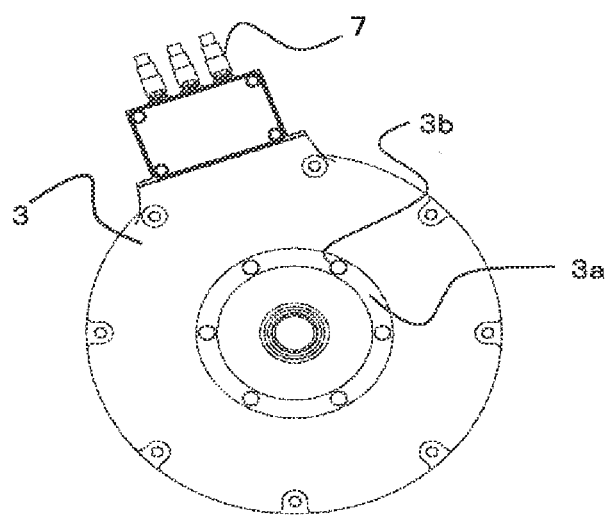
FIG. 4 is a plan view showing the configuration of the major portion of the rotating electrical machine of FIG. 3.

More specifically, as can be obvious from FIG. 3 and FIG. 4 showing a state in which the supporting members 6 are omitted, through-holes 3b and 23a are provided, respectively, to the housing 3 and the rotor boss section 23 on a common circle. By inserting the supporting members 6 into these through-holes 3b and 23a, the rotor boss section 23 can be positioned from the outside of the housing 3.

The supporting members 6 are formed so that the heads have a diameter larger than a diameter of the through-holes 3b. This configuration prevents the supporting members 6 from failing off by passing through the housing 3. Further, by providing the housing 3 with the annular groove 3a to store the heads of the supporting members 6, the heads of the supporting members 6 are prevented from protruding from an end face of the housing 3.

As has been described, by allowing tip ends of the supporting members 6 attached to the housing 3 to protrude to a position below the supporting surface of the bearing 5 attached to the housing 3, the rotor boss section 23 can be positioned and supported over an axially long range. Consequently, the entire rotor 2 can be prevented from inclining.

Figure 5:
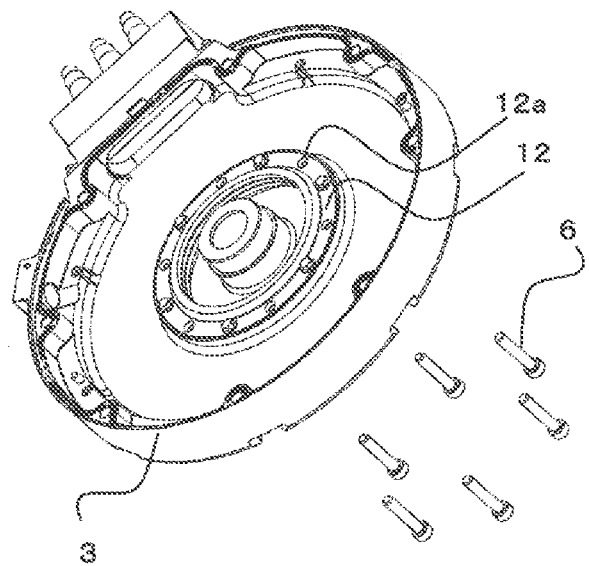
FIG. 5 is a developed perspective view showing a configuration of another major portion according to the first embodiment of the invention.
Figure 6:
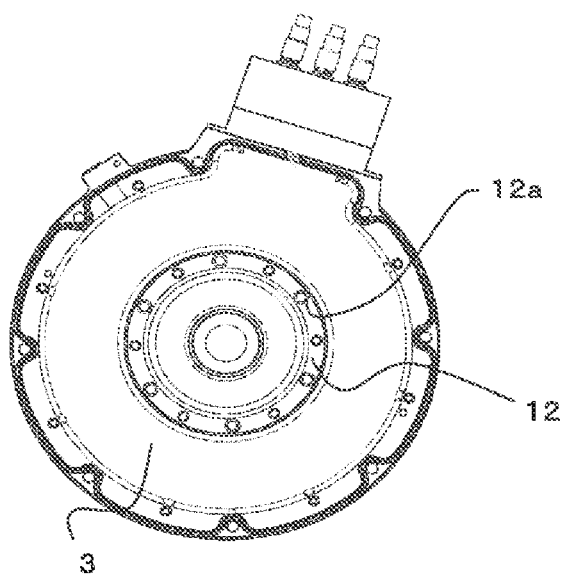
FIG. 6 is a plan view showing the configuration of the major portion of the rotating electrical machine of FIG. 5.

As are shown in FIG. 5 and FIG. 6, in a case where positions at which to insert the supporting members 6 fall on the outer peripheral side of the resolver stator 12, multiple through-holes 12a are provided also to the resolver stator 12, so that the supporting members 6 are inserted into the through-holes 12a.

Second Embodiment

Figure 7:
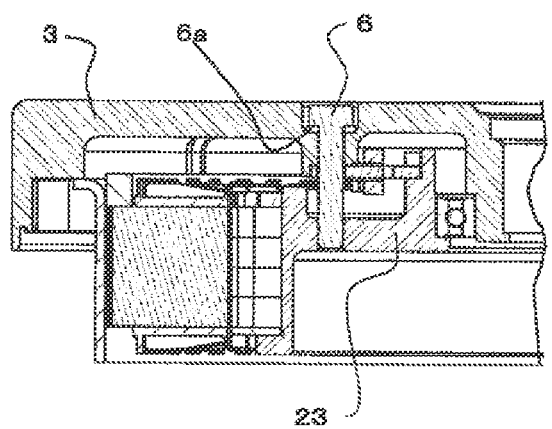
FIG. 7 is a cross section schematically showing a configuration of a rotating electrical machine according to a second embodiment of the invention.
Figure 8:
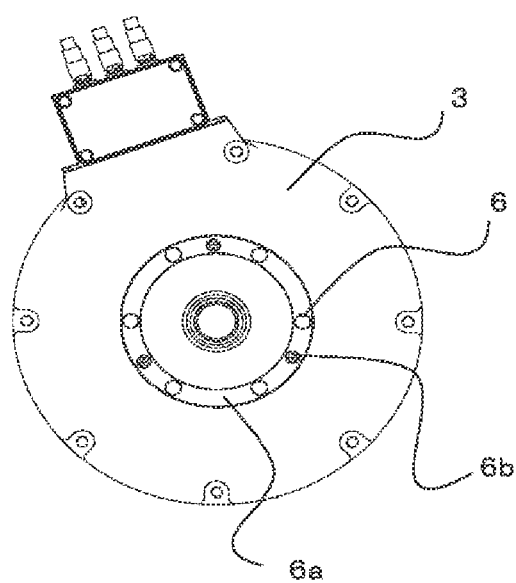
FIG. 8 is a plan view showing a configuration of a major portion of the rotating electrical machine of FIG. 7.
Figure 9:
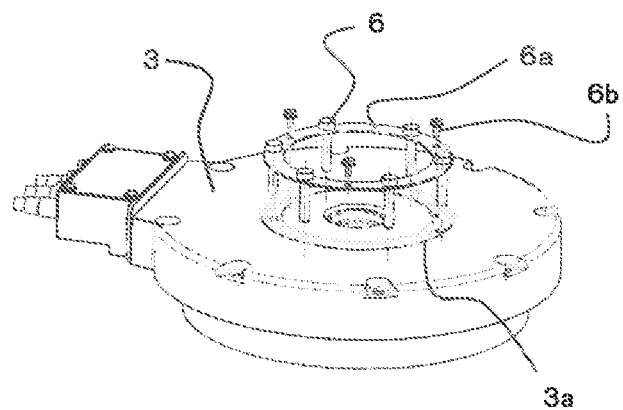
FIG. 9 is a developed perspective view showing the configuration of the major portion of the rotating electrical machine of FIG. 7.

FIG. 7 is a cross section schematically showing a configuration of a rotating electrical machine according to a second embodiment of the invention. FIG. 8 is a plan view of FIG. 7. FIG. 9 is a developed perspective view showing a configuration of a major portion of the second embodiment.

Referring to the drawings, multiple supporting members 6 are formed integrally with a disc-like plate 6a and the disc-like plate 6a is fit into the annular groove 3a in the housing 3. Thereafter, the disc-like plate 6a is fixedly fastened to the housing 3 with screws 6b. By forming the supporting members 6 integrally with the disc-like plate 6a in this manner, the number of components can be reduced. In addition, because the plate 6a is screwed to the housing 3, attachment and removal operations can be easier in comparison with a case where the supporting members 6 are attached one by one.

Also, in a case where the rotating electrical machine is assembled in a place different from where the vehicle is assembled, the rotating electrical machine is transported and formed into one unit with the clutch and the like. Inconveniences possibly occurring in such a case, however, can be also prevented by supporting the rotor by the supporting member 6.

INDUSTRIAL APPLICABILITY

As has been described, the invention can prevent a rotor from inclining using a simple structure without using a large-scale jig and therefore enhance the ease of a fitting operation of a rotating electrical machine in a hybrid vehicle.

It should be appreciated that the embodiments of the invention can be modified or omitted as needed within the scope of the invention.

REFERENCE SIGNS LIST

1: stator
2: rotor
3: housing
4: frame
5: bearing
6: supporting member
11: stator core
12: resolver stator
21: rotor core
22: permanent magnet
24: rotation shaft
25: resolver rotor
23: rotor boss section
3a: annular groove
3b, 12a, and 23a: through-holes
6a: plate
6b: screw

The invention claimed is:

1. A rotor-holding structure of a rotating electrical machine for hybrid vehicle, comprising:
a stator fixed to a housing; and
a rotor oppositely spaced apart from the stator by a predetermined space,
the rotor-holding structure being characterized in that:
the rotor has a rotor boss section rotatably attached to the housing via a bearing and a rotor core and a permanent magnet both attached to the rotor boss section;
supporting members; and
multiple through-holes are provided to each of the housing and the rotor boss section at locations at which the respective through-holes in the housing correspond to the respective through-holes in the rotor boss section, so that the rotor boss section is held by inserting the supporting members into the respective through-holes, wherein the supporting members extend through the housing and beyond the bearing in an axial direction of the rotor.

2. The rotor-holding structure of a rotating electrical machine for hybrid vehicle according to claim 1, wherein the supporting members are shaped like circular cylinders with heads;

an annular groove wider than the through-holes is provided to the housing; and the heads of the supporting members are stored in the groove.

3. The rotor-holding structure of a rotating electrical machine for hybrid vehicle according to claim 1, wherein:

the supporting members are attached to the housing so that tip ends of the supporting members protrude to a position below where the bearing comes in contact with the rotor boss section.

4. The rotor-holding structure of a rotating electrical machine for hybrid vehicle according to claim 1, wherein a resolver stator is fixed inside the housing; and multiple through-holes are provided to the resolver stator; and the supporting members are inserted into the through-holes in the housing, the resolver stator, and the rotor boss section.

5. The rotor-holding structure of a rotating electrical machine for hybrid vehicle according to claim 2, wherein the multiple supporting members are connected to form one unit using a disc-like plate; and the plate is fit into the groove in the housing.

* * * * *